Feb. 10, 1942.  H. KOESTER  2,272,527
BELT FASTENER
Filed Nov. 29, 1940
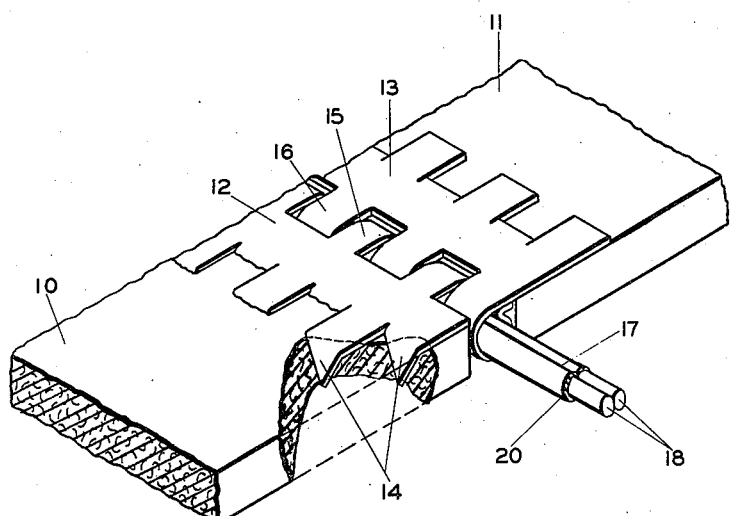
FIG. 1
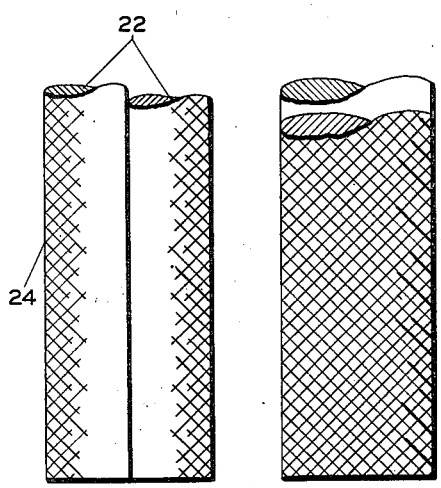
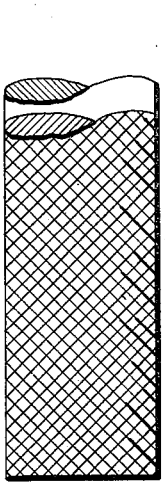
FIG. 4  FIG. 5
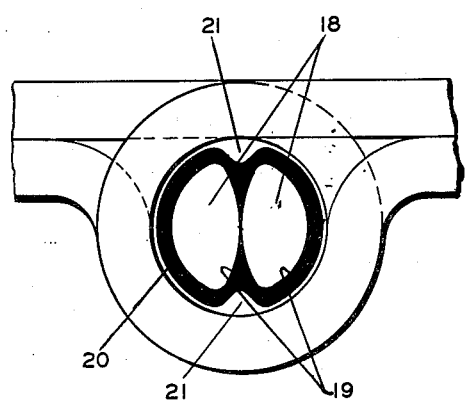
FIG. 2
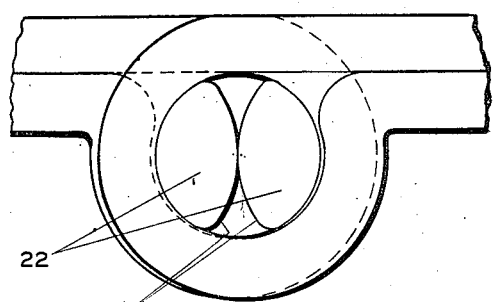
FIG. 3
*INVENTOR.*
Herman Koester
BY E.C. Sanborn
*Attorney*

Patented Feb. 10, 1942

2,272,527

UNITED STATES PATENT OFFICE 2,272,527

BELT FASTENER

Herman Koester, Waterbury, Conn., assignor to The Bristol Company, Waterbury, Conn., a corporation of Connecticut Application November 29, 1940, Serial No. 367,754

15 Claims. (Cl. 24—33)

This invention relates to belt fasteners, and more especially to a hinged fastener for providing jointure between adjacent ends of a flat belt of leather or similar flexible material.

In the earlier fasteners of this class it was the custom to provide two similar hinge elements adapted for attachment to the material of the belt and having interleaved loop members coordinated by the insertion of a single pin of substantially cylindrical cross-section. With a view to eliminating friction and attendant wear in fasteners of this type, there have been developed divided pins, each made up of two parts, adapted for engagement with the interior surfaces of the loop members, and conformed for mutual rolling or rocking action.

Experience with fasteners having pins of this type has shown that there exists a tendency for the rolling or rocking surfaces to slide on each other as the belt flexes about the pulleys, and also that any unevenness of tension on the two edges of the belt may cause the pin to work out of place laterally of the belt and release the fastening.

It is an object of this invention to provide a divided hinge pin of the rocker-point class which may be used to replace a simple cylindrical pin and in which the two elements forming the pin are maintained in definite relation to the hinge parts, thereby eliminating both sliding friction and the tendency to work out of place during use.

It is a further object of this invention to provide a pin of this class which may be used to replace the simple cylindrical pin in belt fasteners of the earlier type having cylindrical loop members, without special conformation of these latter parts.

In carrying out the invention it is proposed to provide for a hinged fastener of the class described a two-part rocker-joint pin adapted to coordinate the interleaving loop members of conventional hinge elements, and having exterior surfaces of substantially cylindrical curvature adapted to engage the interior surfaces of said loop members in a manner to remain in substantially fixed engagement therewith so long as tension is maintained on the fastener.

In the drawing:

Fig. 1 is a perspective view partly in section of a portion of a complete belt fastener embodying the invention, and showing one form of hingepin adapted for use therewith in a partially inserted position.

Fig. 2 shows to an enlarged scale an end elevation of a joint including a pin of the above type in place, before applying stress to the belt.

Fig. 3 is an end elevation of a joint including an alternative form of pin.

Figs. 4 and 5 are top and side elevations respectively of said alternative form of pin.

Referring now to the drawing:

In Fig. 1 are shown two adjacent ends 10 and 11 of a belt, said ends having mounted thereon hinge members 12 and 13 respectively, the same being secured to the ends of the belt by any conventional method, as, for example, by claw portions formed from the material of the hinge members and forcibly driven into the material of the belt. The hinge members are provided with alternating loop parts 15 and 16 of substantially circular curvature, and so disposed that said parts may be interleaved to form a substantially circular curvature, and so disposed that said parts may be interleaved to form a substantially cylindrical channel extending transversely of the belt at the point of jointure and having its axis lying between the planes determining respectively the outer and inner surfaces of the belt.

Operative coordination of said hinge parts is effected by means of a pin member 17 inserted in the cylindrical channel formed by the loop portions 15 and 16. Said pin member comprises two similar elongated parts 18 provided with juxtaposed inwardly-directed convex surfaces 19 of substantially cylindrical curvature to provide a rolling line of contact. The outer surfaces of the parts 18 are conformed to a substantially cylindrical curvature, such that when said parts are placed in operative juxtaposition for rolling contact between their inner surfaces, said outer surfaces form elements of a common cylinder of slightly smaller diameter than that of the channel formed by the loop parts 15 and 16.

The parts 18 being juxtaposed into their normal operating relationship, there is formed about them, as by dipping or otherwise, an enclosing envelope 20 of rubber or similar resilient material, intimately vulcanized or otherwise coated upon the metallic surfaces of said parts, whereby the same are integrated to constitute the pin member 17, and at the same time provided with an external surface adapted for frictional engagement with the interior of the cylindrical channel formed by the loop parts 15 and 16. Resiliency is increased, and freedom of operation assured by the formation of longitudinal grooves 21 in the resilient coating on opposite surfaces of the composite pin, these grooves lying substantially on a diameter forming a common tangent to the juxtaposed convex surfaces 19. These grooves formed longitudinally of the pin member serve also as a guide in installing the pin, it being required that the installer, after bringing the hinge portions into interleaving relationship, insert the pin so that the grooves lie on a line substantially perpendicular to the face of the belt as shown in Fig. 2. Upon the belt being tightened about the pulleys with which it is to be used, the coated surface of the pin will be forced into engagement with the interior surfaces of the loop parts, frictionally engaging the same, effectively preventing any relative motion except the desired rolling action between the convex surfaces 19, and at the same time providing a cushioning action whereby operating stresses are uniformly distributed over the length of the pin.

In Figs. 3, 4, and 5 is shown an alternative form of hinge pin which may be used interchangeably with that previously described for the purpose of cooperatively uniting a pair of interleaved hinge members having circular loop parts forming a substantially cylindrical channel. This pin differs from that previously described, in being wholly formed of metal; and in order that the purpose of the invention may be effectually carried out it is desirable that the knurled parts be formed of a metal somewhat harder than the material engaged thereby.

Two similar elongated pin elements 22 are formed, as in the previously described embodiment, with convex cylindrically curved inwardly directed engaging surfaces 23 cooperating to form a line contact adapted for rolling action through a limited angle. The outwardly directed surfaces 24 are formed to a cylindrical curvature substantially the same as that of the inner surfaces of the loop parts 15 and 16. The thickness of the pin elements is so proportioned that when the rolling surfaces 23 are in contact, the over-all diameter of the composite pin so formed will be slightly less than the diameter represented by the cylindrical curvature of the surfaces 24, permitting the pin to be inserted freely into the cylindrical channel formed by the loop parts and allowing sufficient clearance that hinge action may take place with a purely rolling action between the elements of the hinge pin, and with no friction or binding between surfaces not subjected to operating stress. In order that proper relationship may be maintained between the pin elements and the hinge parts, and that there be no longitudinal displacement or any rotary motion other than the desired rolling action, the outer surfaces 24 of the hinge pin elements are provided with a knurled or roughened finish. Thus, while the pin may be freely inserted into the receiving channel when the belt is slack, as soon as operating tension is placed upon the hinged fastener, the knurling of the hardened pin elements, will embed in the inner surfaces of the loop parts 15 and 16, effectively preventing any relative motion except the desired rolling action between the convex surfaces 23.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a belt fastening, the combination with a pair of hinge elements attachable to the opposite ends of a belt, each of said hinge elements including loop portions, said portions of the respective elements being interleaved to form an interior channel; of a hinge-pin comprising a pair of members with convex inwardly directed surfaces to be maintained by the stress of said belt in mutual engagement for rolling contact, the outer portions of said members being shaped in substantial conformity with the interior surface of said channel, and means extending from said members into frictional engagement with the interior surface of said channel when said belt is in a state of tension for maintaining said members against substantial displacement in said channel.

2. In a belt fastening, the combination with a pair of hinge elements attachable to the opposite ends of a belt, each of said elements including loop portions having curved interior surfaces, said portions of the respective elements being interleaved to form a curved interior channel; of a hinge-pin comprising a pair of members wtih convex inwardly directed surfaces to be maintained by the stress of said belt in mutual engagement for rolling contact, the outer portions of said members being curved in substantial conformity with the curvature of said channel, and means extending from said members into frictional engagement with the interior surface of said channel when said belt is in a state of tension for maintaining said members against substantial displacement in said channel.

3. In a belt fastening, the combination with a pair of hinge elements attachable to the opposite ends of a belt, each of said hinge elements including looped portions of substantially circular internal curvature, and said portions of the respective elements being interleaved to form a substantially cylindrical channel; of a hinge-pin member comprising two similar parts with convex inwardly directed surfaces to be maintained by the stress of said belt in mutual engagement for rolling contact and outwardly directed surfaces of substantially cylindrical curvature, and means extending from said parts into frictional engagement with the interior surface of said channel when said belt is in a state of tension for maintaining said parts against substantial displacement in said channel.

4. In a belt fastening, the combination with a pair of hinge elements attachable to the opposite ends of a belt, each of said hinge elements including loop portions, said portions of the respective elements being interleaved to form an interior channel; of a hinge-pin comprising a pair of members with convex inwardly directed surfaces to be maintained by the stress of said belt in mutual engagement for rolling contact, the outer portions of said members being shaped in substantial conformity with the interior surface of said channel, and means extending from said members into non-slipping engagement with the interior surface of said channel when said belt is in a state of tension.

5. In a belt fastening, the combination with a pair of hinge elements attachable to the opposite ends of a belt, each of said hinge elements including loop portions, said portions of the respective elements being interleaved to form an interior channel; of a hinge-pin comprising a pair of members with convex inwardly directed surfaces to be maintained by the stress of said belt in mutual engagement for rolling contact, the outer portions of said members being shaped in substantial conformity with the interior surface of said channel, and means extending from said members into positive engagement with the interior surface of said channel when said belt is in a state of tension.

6. In a belt fastening, the combination with a pair of hinge elements attachable to the opposite ends of a belt, each of said hinge elements including loop portions, said portions of the respective elements being interleaved to form an interior channel; of a hinge-pin comprising a pair of members with convex inwardly directed surfaces to be maintained by the stress of said belt in mutual engagement for rolling contact and outwardly directed surfaces shaped in substantial conformity with the interior surface of said channel, said outwardly directed surfaces of said member being adapted for frictional engagement with said interior surface of said channel when said belt is in a state of tension.

7. In a belt fastening, the combination with a pair of hinge elements attachable to the opposite ends of a belt, each of said hinge elements including loop portions, said portions of the respective elements being interleaved to form an interior channel; of a hinge-pin comprising a pair of members with convex inwardly directed surfaces to be maintained by the stress of said belt in mutual engagement for rolling contact and outwardly directed surfaces shaped in substantial conformity with the interior surface of said channel, said outwardly directed surfaces of said member having means thereon for frictionally engaging said inner surface of said channel when said belt is under tension to prevent substantial displacement of said members in said channel.

8. In a belt fastening, the combination with a pair of hinge elements attachable to the opposite ends of a belt, each of said hinge elements including loop portions, said portions of the respective elements being interleaved to form an interior channel; of a hinge-pin comprising a pair of members with convex inwardly directed surfaces to be maintained by the stress of said belt in mutual engagement for rolling contact and outwardly directed surfaces shaped in substantial conformity with the interior surface of said channel, said outwardly directed surfaces of said member being roughened for frictional engagement with said inner surface of said channel when said belt is under tension.

9. In a belt fastening, the combination with a pair of hinge elements attachable to the opposite ends of a belt, each of said hinge elements including loop portions, said portions of the respective elements being interleaved to form an interior channel; of a hinge-pin comprising a pair of members with convex inwardly directed surfaces to be maintained by the stress of said belt in mutual engagement for rolling contact and outwardly directed surfaces shaped in substantial conformity with the interior surface of said channel, said outwardly directed surfaces of said member having means thereon for non-slipping engagement with said inner surface of said channel when said belt is under tension.

10. In a belt fastening, the combination with a pair of hinge elements attachable to the opposite ends of a belt, each of said hinge elements including loop portions, said portions of the respective elements being interleaved to form an interior channel; of a hinge-pin comprising a pair of members with convex inwardly directed surfaces to be maintained by the stress of said belt in mutual engagement for rolling contact and outwardly directed surfaces shaped in substantial conformity with the interior surface of said channel, said outwardly directed surfaces of said member having means thereon for positive engagement with said inner surface of said channel when said belt is under tension.

11. In a belt fastening, the combination with a pair of hinge elements attachable to the opposite ends of a belt, each of said hinge elements including loop portions, said portions of the respective elements being interleaved to form an interior channel; of a hinge-pin comprising a pair of members with convex inwardly directed surfaces to be maintained by the stress of said belt in mutual engagement for rolling contact, the outer portions of said members being shaped in substantial conformity with the interior surface of said channel, and resilient means surrounding said members within said channel.

12. In a belt fastening, the combination with a pair of hinge elements attachable to the opposite ends of a belt, each of said hinge elements including loop portions, said portions of the respective elements being interleaved to form an interior channel; of a hinge-pin comprising a pair of members with convex inwardly directed surfaces to be maintained by the stress of said belt in mutual engagement for rolling contact, the outer portions of said members being shaped in substantial conformity with the interior surface of said channel, and resilient means surrounding said members within said channel and frictionally engaging said inner surface of said channel when said belt is under tension.

13. In a belt fastening, the combination with a pair of hinge elements attachable to the opposite ends of a belt, each of said hinge elements including loop portions, said portions of the respective elements being interleaved to form an interior channel; of a hinge-pin comprising a pair of members with convex inwardly directed surfaces to be maintained by the stress of said belt in mutual engagement for rolling contact, the outer portions of said members being shaped in substantial conformity with the interior surface of said channel, and resilient means surrounding said members within said channel and frictionally engaging said inner surface of said channel when said belt is under tension, said resilient means having longitudinally extended grooves lying on a diameter normal to the direction of said stress.

14. In a belt fastening, the combination with a pair of hinge elements attachable to the opposite ends of a belt, each of said hinge elements including loop portions, said portions of the respective elements being interleaved to form an interior channel; of a hinge-pin comprising a pair of members with convex inwardly directed surfaces to be maintained by the stress of said belt in mutual engagement for rolling contact, the outer portions of said members being shaped in substantial conformity with the interior surface of said channel, and means providing for frictional engagement between said members and said interior surface of said channel when said belt is under tension to prevent substantial displacement of said members in said channel.

15. In a belt fastening, the combination with a pair of hinge elements attachable to the opposite ends of a belt, each of said hinge elements including loop portions, said portions of the respective elements being interleaved to form an interior channel; of hinge-pin means within said channel, and a sleeve of flexible material surrounding said hinge-pin means and frictionally engaging the interior surface of said channel to prevent substantial displacement of said hinge-pin means in said channel.

HERMAN KOESTER.